(No Model.)
J. H. MITCHELL.
CONTINUOUS DOUGH SHEETING MACHINE.
No. 443,862. Patented Dec. 30, 1890.
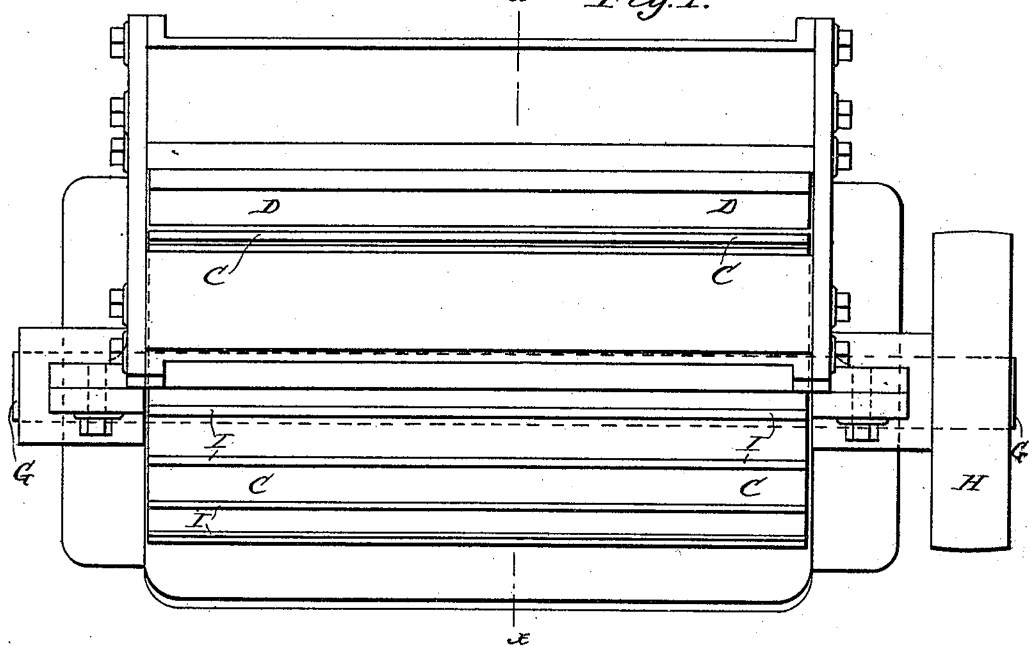
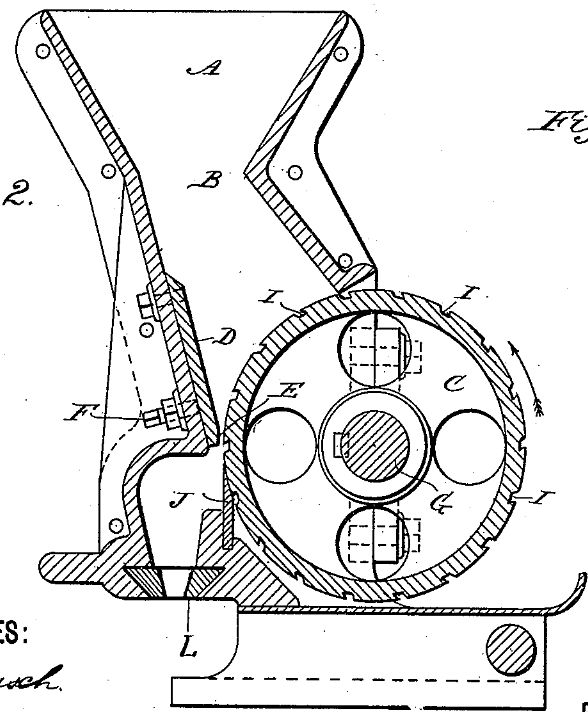
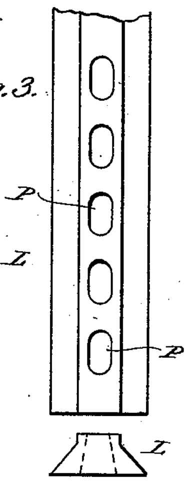
WITNESSES:
D. C. Reusch.
S. D. Moss
INVENTOR
J. H. Mitchell.
BY A. M. Pierce.
ATTORNEY
THE NORRIS PETERS CO., PHOTO-LITHO., WASHINGTON, D. C.

UNITED STATES PATENT OFFICE.

JAMES HENRY MITCHELL, OF PHILADELPHIA, PENNSYLVANIA.

CONTINUOUS DOUGH-SHEETING MACHINE.

SPECIFICATION forming part of Letters Patent No. 443,862, dated December 30, 1890.

Application filed August 30, 1890. Serial No. 363,547. (No model.)

*To all whom it may concern:*

Be it known that I, JAMES HENRY MITCHELL, a citizen of the United States, residing at Philadelphia, in the county of Philadelphia and State of Pennsylvania, have invented new and useful Improvements in Continuous Dough-Sheeting Machines, of which the following is a specification.

My invention relates especially to devices employed for forming dough into continuous sheets or strips, and has for its object the provision of a machine simple and cheap to construct, easy to operate, which will not choke or clog up, and whereby the requisite compression of the dough is insured.

To attain the desired end my invention consists, essentially, in a dough-hopper having a constricted throat, mounted above a grooved roller, a compressing-chamber located in such a manner as to have a regulated communication with the feeding-hopper, and in said chamber a loosely-mounted stripping-knife, which bears against the periphery of the roller; and my invention also involves certain other novel and useful combinations or arrangements of parts and peculiarities of construction and operation, all of which will be hereinafter first fully described, and then pointed out in the claims.

In the drawings, Figure 1 is a plan view of my sheeting-machine. Fig. 2 is a cross-sectional view at line $x\,x$ of Fig. 1. Fig. 3 is a view of one form of die to be placed beneath the dough-compressing chamber.

Like letters of reference wherever they occur indicate corresponding parts in all the figures.

A is the feed-hopper, having a constricted throat B. By this arrangement when the dough passes down below the throat and presses against the roller or cylinder C it cannot be again forced up toward the top of the feed-hopper.

D is a plate mounted near the bottom of hopper A. This plate is cut away at E, and is provided with set-screws F, whereby the space between the plate D and periphery of roller C may be accurately regulated to suit the requirements of the work to be done. In setting this plate D, which practically forms the side of the hopper, the holding screws or bolts near the top are loosened if it is desired to throw the bottom of the plate toward the periphery of the roller, and its position at bottom is regulated by means of the set-screws F, which are provided with jam-nuts for holding the screw, and consequently the plate D, in the desired position. The roller C is journaled beneath hopper A upon a shaft G, whereon is a driving-pulley H. This roller is provided with grooves I, which are preferably cut backward, so that one edge overhangs, as illustrated in Fig. 2. I have shown these grooves out of proportion to the size of the roller for convenience of illustration and a greater distance apart than they are in actual practice.

J is a compressing-chamber beneath hopper A.

K is a plate or knife loosely mounted at one side of chamber J and the cutting-edge resting against the periphery of roller C.

L is a bottom plate arranged to slide beneath chamber J. This plate may have separate perforations P therein, of any desired shape, or a continuous longitudinal slot, as required by the work to be done.

The operation of my machine is as follows: Dough being placed in hopper A, the roller C is caused to revolve in the direction indicated by the arrow, Fig. 2. The dough passes downward and presses against roller C, and is forced by the rotation of the roller into the slots I, where it is held and caused to move with the roller, thereby forcing a continuous sheet of dough into chamber J by adhesion to the roller, where it is firmly packed before escaping from the bottom of said chamber onto a carrying-belt. The knife K will be forced against roller C, stripping the dough from the surface thereof, while leaving the grooves filled with dough, which moves with the roller. The pressure of the knife against the roller will be in accordance with the compression of the dough in the chamber J, and a thorough cleaning of the surface of the roller is insured, while at the same time no dough, flour, &c., excepting that which is packed in the grooves I, can be carried outside of the hopper and the only friction caused by the dough will be confined to the hopper.

As dough adheres much more readily to dough than to the smooth surface of a roller, the advantages of my construction of roller will be obvious, and the dough will be compressed in chamber J with greater rapidity and force than has heretofore been attained.

Having now fully described my invention, what I claim as new therein, and desire to secure by Letters Patent, is—

1. The combination, with the compressing-roller, of a hopper one side of which is made adjustable and converges toward the roller, whereby the discharge-opening may be varied by moving said side of the hopper toward or from the roller upon a plane with the axis of the roller, substantially as shown and described.

2. In a dough-sheeting machine, a compressing-roller having longitudinal grooves or pockets formed in its periphery, substantially as shown and described.

3. The combination, with the compressing-roller, of a knife or plate loosely mounted at the side of the receiving-chamber, the upper edge thereof resting against the periphery of the roller, substantially as shown and described.

JAMES HENRY MITCHELL.

Witnesses:

S. D. MOTT,

A. M. PIERCE.